United States Patent [19]

Matsumoto et al.

[11] Patent Number: 4,779,131

[45] Date of Patent: Oct. 18, 1988

[54] APPARATUS FOR DETECTING TELEVISION IMAGE MOVEMENT

[75] Inventors: Kunio Matsumoto; Tadao Fujita; Kenji Takanashi, all of Kanagawa; Yutaka Tanaka; Toshiro Ohmura, both of Tokyo; Taiichiro Kurita; Yoshimichi Ohtsuka, both of Kanagawa; Taiji Nishizawa, Tokyo; Yuichi Ninomiya, Kanagawa, all of Japan

[73] Assignees: Sony Corporation; Nippon Hoso Kyokai, both of Tokyo, Japan

[21] Appl. No.: 889,224

[22] Filed: Jul. 25, 1986

[30] Foreign Application Priority Data

Jul. 26, 1985 [JP] Japan .................. 60-165072
Jul. 26, 1985 [JP] Japan .................. 60-165073
Jul. 26, 1985 [JP] Japan .................. 60-165074
Jul. 26, 1985 [JP] Japan .................. 60-165071

[51] Int. Cl.$^4$ ............................................. H04N 7/18
[52] U.S. Cl. ............................................. 358/105
[58] Field of Search ............... 358/105, 166, 37, 108, 358/160, 104

[56] References Cited

U.S. PATENT DOCUMENTS

4,218,703  8/1980  Netravali ................. 358/105
4,307,420  12/1981  Ninomiya ................. 358/105
4,639,782  1/1987  Fujita ...................... 358/166
4,661,846  4/1987  Kondo ...................... 358/105
4,661,853  4/1987  Roeder ..................... 358/105
4,663,665  5/1987  Tanaka ..................... 358/105

Primary Examiner—Tommy P. Chin
Attorney, Agent, or Firm—Lewis H. Eslinger; Jay H. Maioli

[57] ABSTRACT

In an apparatus for detecting movement of a television image in response to frame difference data corresponding to a difference between present frame data and previous frame data, a video signal is divided into a plurality of segmental areas for each frame, a pixel or picture element is selected to represent each of the segmental areas, frame difference data are produced for each of the segmental areas by calculating differences in the position or coordinates of a pixel representative of a segmental area of a previous frame from the respective picture element of the corresponding segmental area in the present frame, and each of the calculated differences smaller than a predetermined magnitude, and which would be characteristic of a stationary background portion of the television image, is omitted from the frame difference data. This is effective to improve the movement vector detection accuracy. The apparatus has a circuit for zeroing the frame difference data, and thereby improving, the movement vector detection reliability when the number of the calculated differences omitted from the frame difference data exceeds a predetermined value.

13 Claims, 7 Drawing Sheets

APPARATUS FOR DETECTING TELEVISION IMAGE MOVEMENT

BACKGROUND OF THE INVENTION

1. Field of the Invention

This invention relates to an apparatus for detecting movement of a television image in response to frame difference data representing the difference between present frame date and previous frame data and, more particularly, is directed to a television image movement detecting apparatus applicable, for example, to a video signal standard conversion circuit.

2. Description of the Prior Art

A block matching method has been used to detect movement vectors each representing the amount and direction of movement of a television image from one frame to the next in response to frame difference data between present frame data and previous frame data. In such block matching method, a video signal is divided into a number of segmental areas or blocks for each frame. The frame difference data are produced for each of the segmental areas by calculating differences in the positions or coordinates of picture elements representing corresponding segmental areas of successive frames. These calculations are effected by a digital computer operable in accordance with a program stored in the computer memory.

In order to simplify the program arrangement and increase the signal processing speed, it has been proposed to designate a point or pixel representative of each of the segmental areas. The representative pixel is normally set at the center of the segmental area. In such case, the frame difference data are produced by calculating differences in the position or coordinates of the pixel representative of a segmental area of one frame relative to the position or coordinates of the respective picture element of the corresponding segmental area of the subsequent frame.

One disadvantage of such representative pixel method is that it fails to detect small movements of an object of uniform brightness. This is particularly true when the moving object appears against a distinctive background which changes greatly across the image.

OBJECTS AND SUMMARY OF THE INVENTION

Accordingly, it is an object of the invention to provide an improved movement vector detecting apparatus which can detect small movements of an object with relatively greater accuracy.

It is another object of the invention to provide a reliable movement vector detecting apparatus which is applicable to video signal standard conversion circuits.

In accordance with an aspect of this invention, in an apparatus for detecting movement of a television image in response to frame difference data representing the difference between present frame data and previous frame data, a video signal is divided into a plurality of segmental areas for each frame, a pixel is selected to represent each of the segmental areas, frame difference data are produced for each of the segmental areas by calculating differences in the position or coordinates of a pixel representative of a segmental area of a previous frame in respect to the position or coordinates of the respective picture element of the corresponding segmental area of a present frame, and means are provided to omit from the frame difference data the calculated differences which are smaller than a predetermined magnitude. This is effective to improve the movement vector detection accuracy.

Further, in accordance with another aspect of this invention, the movement vector detecting apparatus, as aforesaid, is provided with means for zeroing the frame difference data, and thereby improving the movement vector detection reliability, when the number of the calculated differences omitted from the frame difference data exceeds a predetermined value, for example, as when the segmental area in question represents a stationary background portion of the television image.

The above, and other objects, features and advantages of the invention, will be apparent from the following detailed description of preferred embodiment which is to be read in connection with the accompanying drawings forming a part hereof and in which the same or corresponding parts or elements are identified by the same reference numerals in the several views.

DETAILED DESCRIPTION OF THE PREFERRED EMBODIMENTS

Prior to describing preferred embodiments of the invention, a vector detecting circuit according to the prior art will be briefly described with reference to FIG. 1 in order to provide a better understanding of the difficulties attendant thereto.

Figure 1:
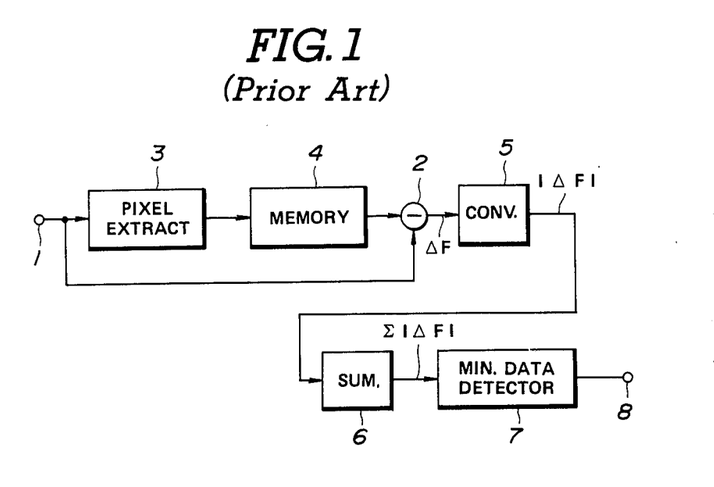
FIG. 1 is a block diagram showing a conventional movement vector detecting circuit.

The conventional movement vector detecting circuit is shown on FIG. 1 to include an input terminal 1 to which a digital video signal is applied. The digital video signal is supplied from input terminal 1 to one input of a subtracter 2 and also to a representative pixel extraction circuit 3. The extraction circuit 3 extracts a pixel or point representative of each of the segmental areas of one frame and produces pixel data indicative of the position or coordinates of the extracted representative pixel. The pixel data are fed from circuit 3 to, and stored in a representative pixel memory 4. The stored data are read out of representative pixel memory 4 and applied at appropriate times to another input of subtracter 2. The data fed from memory 4 to subtracter 2 are previous frame data and the digital video signal applied directly from input terminal 1 to subtracter 2 is present frame data. The subtracter 2 produces frame difference data ΔF by calculating differences between the position or coordinates of the pixel representative of a segmental area of the previous frame and the position or coordinates of the respective picture element of the corresponding segmental area of the subsequent or present frame. The frame difference data ΔF are converted by a converter 5 into data |ΔF| representing absolute values of the respective differences. The data |ΔF| are fed to a summation circuit 6 which adds or sums the absolute values of the differences for the respective picture elements of each of the segmental areas to provide frame difference summation data Σ|ΔF|. The frame difference summation data Σ|ΔF| are fed to a minimum data detection circuit 7. The minimum data detection circuit 7 receives frame difference summation data Σ|ΔF| fed successively thereto from summation circuit 6 while all of the segmental areas of one frame are being processed and detects the minimum one of the received frame difference summation data Σ|ΔF| to produce a signal indicative of a movement vector which represents the amount and direction of movement of a television image from the previous frame to the present frame. This movement vector indicating signal appears at an output terminal 8.

Figure 2:
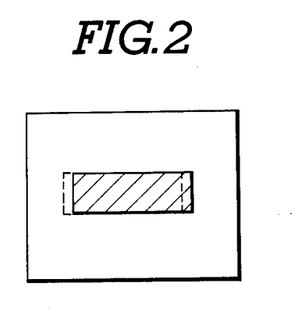
FIG. 2 is a diagram illustrating a small movement of an object in a television image.
Figure 3:
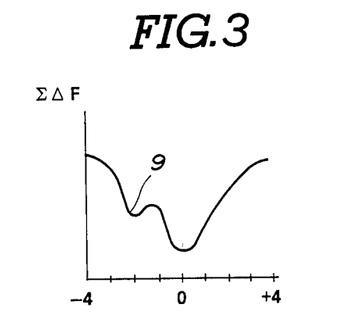
FIGS. 3–5 are graphs to which reference will be made in explaining the operation of the conventional circuit of FIG. 1.
Figure 4:
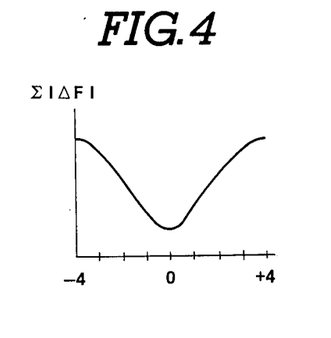
Figure 5:
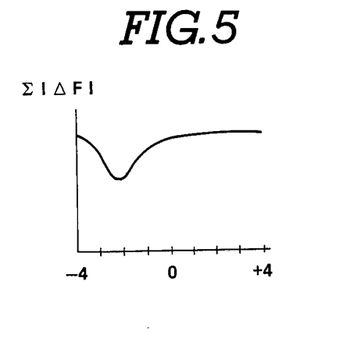

If it is assumed that, as shown in FIG. 2, an object included in a television image moves in the horizontal direction from a position indicated in solid lines to a position indicated in broken lines, the described conventional movement vector detection apparatus cannot reliably detect a small movement of the object, that is, one in which the opposite end areas corresponding to the movement of the object are very small. FIG. 3 depicts the frame difference summation data Σ|ΔF| when the object moves a small distance, and each segmental area includes 63 picture elements, that is, seven lines each having nine picture elements thereon. As can be seen from FIG. 3, the minimum frame difference summation data corresponds to a zero movement vector. This means that the prior art apparatus of FIG. 1 indicates that the object remains at rest in spite of the fact that the object moves, as indicated at 9 on FIG. 3. A similar problem arises when the background against which the object moves is distinct and changes greatly across the image. The reason for this will be apparent from FIGS. 4 and 5, in which FIG. 4 shows the frame difference summation data Σ|ΔF| for a distinct background and FIG. 5 shows the frame difference summation data Σ|ΔF| for a moving object. It may be appreciated that, if an object moves against a distinct background, the frame difference summation data Σ|ΔF| will vary in a manner substantially as shown on FIG. 3 which is substantially a combination of the graphs of FIGS. 4 and 5.

Figures 6, 7, 8:
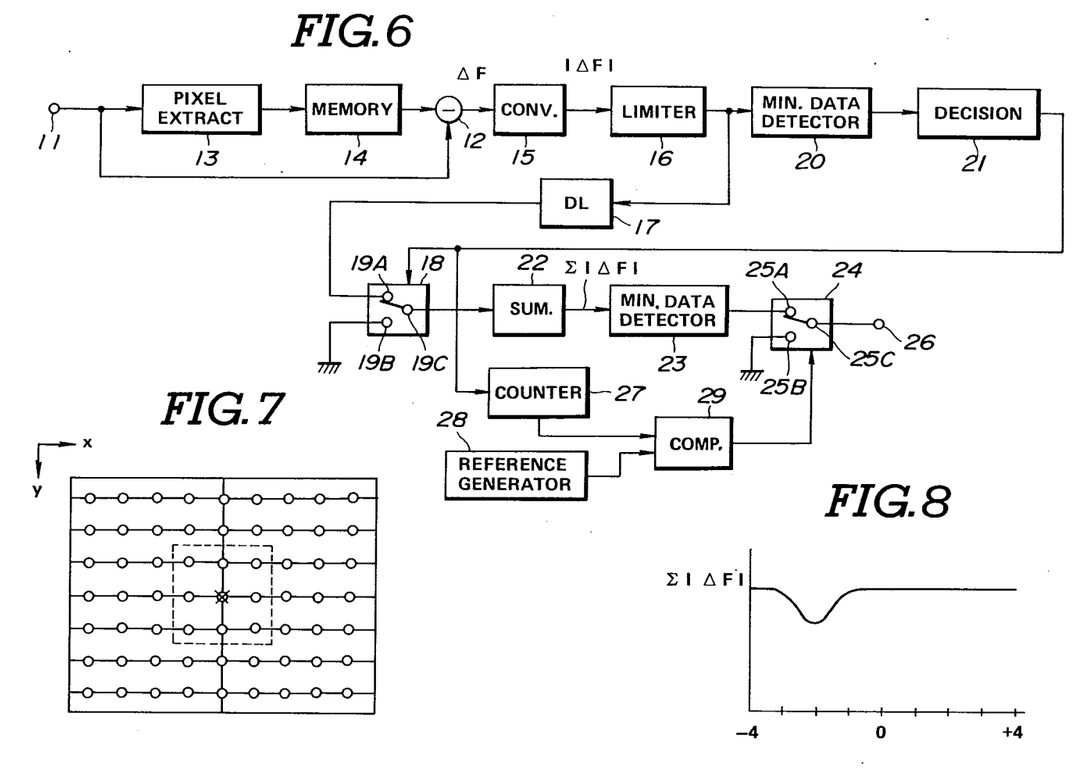
FIG. 6 is a block diagram showing a movement vector detecting circuit in accordance with an embodiment of this invention.
FIG. 7 is a diagram showing a segmental video signal area having a representative pixel at the center thereof.
FIG. 8 is a graph to which reference will be made in explaining the operation of the movement vector detecting circuit of FIG. 6.

A video signal to be received by a movement vector detection circuit in accordance with the present invention is divided into a plurality of segmental video signal areas for each frame. Each segmental area includes 63 picture elements, that is, seven lines each carrying nine picture elements, as shown in FIG. 7. Each segmental area is represented by the position or coordinates (x,y) of a representative pixel placed at the center of the segmental area, as designated by the character X in FIG. 7. The segmental areas may be defined to partially overlap each other.

Referring now to FIG. 6, it will be seen that a movement vector detection circuit according to an embodiment of this invention includes an input terminal 11 to which a digital video signal is applied. The digital video signal is supplied from input terminal 11 directly to one input of a subtracter 12 and also to a representative pixel extraction circuit 3. The representative pixel extraction circuit 13 extracts a pixel or point representative of each of the segmental areas of one frame and produces pixel data indicative of the position or coordinates of the extracted representative pixel. Such pixel data are read into, and stored in a representative pixel memory 14. The stored data are read out of representative pixel memory 14 and applied, as previous frame data, to another input of subtracter 12. The digital video signal applied directly from input terminal 11 to the first mentioned input of subtracter 12 carries present frame data which relate to the positions or coordinates of respective picture elements included in the corresponding segmental area of the present frame. Consequently, subtracter 12 produces frame difference data ΔF by calculating differences in the position or coordinates of the pixel representative of the segmental area of the previous frame from the position or coordinates of the respective picture element of the corresponding segmental area of the present frame. The frame difference data ΔF are converted by a converter 15 into data |ΔF| representing absolute value of the respective differences. The absolute values of frame difference data |ΔF| are fed to a limiter circuit 16 which limits the values of the differences of the data |ΔF| below a predetermined value.

The output of the limiter circuit 16 is applied to a minimum data detector circuit 20. The minimum data detector circuit 20 detects the position or address of the picture element for which the absolute value of the frame difference data |ΔF| is detected to be a minimum. The output of detector circuit 20 is applied to a decision circuit 21 which determines whether or not the detected picture element is in a small vector region enclosed by the broken line on FIG. 7. If the picture element is in that small vector region, then it means that the movement vector will be too small to be reliably considered and decision circuit 21 produces a low level control signal. Otherwise, decision circuit 21 produces a high level control signal which is applied to a switching circuit 18.

The switching circuit 18 has a first input terminal 19A connected through a delay circuit 17 to limiter circuit 16, a second input terminal 19B connected to ground or a source of zero data, and an output terminal 19C connected to a summation circuit 22. Switching circuit 18 responds to a high level control signal from decision circuit 21 to cause engagement of terminals 19A and 19C and thereby permit summation circuit 22 to receive the data $|\Delta F|$ from limiter circuit 16. Delay circuit 17 delays the signal from limiter circuit 16 to switch input terminal 19A so as to compensate for the inherent delay in the time of arrival of the control signal at switching circuit 18. Summation circuit 22 sums the absolute values of the data differences for the picture elements of each of the segmental areas to provide frame difference summation data $\Sigma|\Delta F|$. Summation circuit 22 preferably includes a digital integrator for summing the data fed from switching circuit output terminal 19C to produce frame difference summation data $\Sigma|\Delta F|$ for the respective picture elements of each of the segmental areas and a memory having a number of addresses or memory sections corresponding to the number of segmental areas included in one field for storing the successively produced frame difference summation data in the respective memory sections.

Switching circuit 18 responds to a low level control signal from decision circuit 21 to cause engagement of terminals 19B and 19C and thereby connect summation circuit 22 to the zero data source. This means that the frame difference data $|\Delta F|$ are omitted from the frame difference summation $\Sigma|\Delta F|$ when the picture element having the minimum absolute value of data difference $|\Delta F|$ is in the small vector region indicated by the dotted line on FIG. 7. The frame difference summation data $\Sigma|\Delta F|$ are fed from summation circuit 22 to a minimum data detector circuit 23. Minimum data detector circuit 23 receives frame difference summation data $\Sigma|\Delta F|$ fed successively thereto from summation circuit 22 while all of the segmental areas of one frame are processed and detects the minimum one of the received frame difference summation data $\Sigma|\Delta F|$ to produce a signal indicative of a movement vector which represents the amount and direction of movement of a television image from the previous frame to the present frame.

A counter 27 also receives the control signal from decision circuit 21 and counts the number of occurrences of a low level control signal therefrom for each period during which all of the picture elements included in one segmental area are processed. The content of the counter 27 represents the number of frame difference data $|\Delta F|$ that are not included in, or omitted from the frame difference summation data $\Sigma|\Delta F|$ for a segmental area. A comparator circuit 29 compares the content of counter 27 with a reference value fed thereto from a reference generator 28. For example, the reference value provided by generator 28 may correspond to 80 percent of the number of the picture elements included in one segmental area. When the content of counter 27 exceeds such reference value, comparator circuit 29 produces a low level control signal to a switching circuit 24. Otherwise, comparator circuit 29 produces a high level control signal. Switching circuit 24 has a first input terminal 25A connected to the output of minimum data detector circuit 23, a second input terminal 25B connected to ground or a source of zero data, and an output 25C connected to an output terminal 26. Switching circuit 24 responds to a high level control signal from comparator circuit 29 to provide a connection between terminals 25A and 25C so that a signal indicative of the movement vector detected in the minimum data detector circuit 23 appears at output terminal 26. Switching circuit 24 responds to a low level control signal from comparator circuit 29 to provide a connection between terminals 25B and 25C so that a zero movement vector appears at output terminal 26.

It will be apparent from the above that the circuit shown on FIG. 6 inhibits generation of an unreliable movement vector by zeroing the detected movement vector when a relatively great number of frame difference data are omitted from the data used in detecting a movement vector.

It is further to be noted that, in the circuit of FIG. 6, switching circuit 18 forms, in effect, gating means for the data difference $|\Delta F|$ so as to supply such data difference $|\Delta F|$ to the summation circuit or accumulating means 22 for inclusion in the frame difference summation data $\Sigma|\Delta F|$ only when the control signal for gating means 18, that is, the output of decision circuit 21, indicates that the segmental area of the frame then being considered does not represent a stationary background portion of the television image. In other words, decision circuit 21 provides a high level control signal to switching or gate means 18 for supplying data difference $|\Delta F|$ to summation or accumulating means 22 only when detector circuit 20 and decision circuit 21 cooperate to indicate that the segmental area of the frame being considered corresponds to a moving object, and not a stationary background portion, in the television image.

With the above described movement vector detecting apparatus embodying the present invention, the minimum frame difference summation data correspond to movement of an object, as shown in FIG. 8, even when the object moves against a distinct background which changes substantially across the television image. Therefore, this invention makes it possible to detect movement vectors with greater accuracy.

Figure 9:
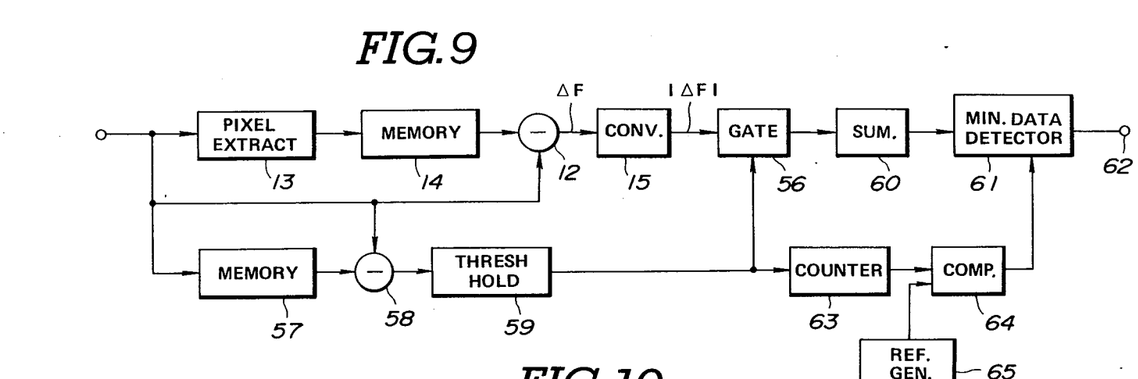
FIG. 9 is a block diagram of a movement vector detecting circuit in accordance with a second embodiment of the invention.

Referring now to FIG. 9, in which a second embodiment of a movement vector detecting apparatus according to the invention is illustrated, it will be seen that the parts or components equivalent to components shown in FIG. 6 are identified by the same reference numerals in FIG. 9.

The apparatus of FIG. 9 further includes a gate circuit 56 through which the data $|\Delta F|$ are fed from converter 15 to a summation circuit 60. Gate circuit 56 supplies a predetermined value, for example, quantization level 64, to summation circuit 60 regardless of the value of the data $|\Delta F|$ fed thereto from converter 15 whenever the picture element is determined to be in a non-movement range, that is, corresponds to a stationary portion of the background of the television image, as described later in detail. This determination is made by a circuit including a frame memory 57, a subtracter 58, and a threshold circuit 59.

Frame memory 57 receives the digital video signal directly from input terminal 11 and provides previous frame data which relate to the positions or coordinates of the respective picture elements of a segmental area included in the previous frame. The previous frame data are fed to subtracter 58 which also receives present frame data directly from input terminal 11. The present frame data relate to the positions or coordinates of the respective picture elements of the corresponding segmental area included in the present frame. The subtracter 58 produces frame difference data representing the difference between the present frame data and the previous frame data by calculating differences between the positions or coordinates of the picture elements of the segmental area of the previous frame and the positions or coordinates of the respective picture elements of the corresponding segmental area of the present frame. If subtracter 58 produces a zero output or difference signal, it is established thereby that the corresponding picture element remains at rest that is, part of a stationary background portion of the television image. In practice, due to noises or other factors, the difference signal from subtracter 58 is not zero when a picture element remains at rest. For this reason, the output of subtracter 58 is coupled to threshold circuit 59 which compares the difference signal with a preferably adjustable threshold value for determining the non-movement range, and which has its output connected to gate circuit 56 as a gating signal for the latter. Threshold circuit 59 produces a low level decision signal or output to cause gate circuit 56 to close and to supply the predetermined value corresponding to quantizing level 64 to summation circuit 60 when the difference signal from subtracter 58 is less than the adjustable threshold value. Otherwise, threshold circuit 59 produces a high level decision signal or output to open gate circuit 56 for passing the data $|\Delta F|$ from converter 15 to summation circuit 60. The output of threshold circuit 59 is also coupled to a counter 63 which counts the number of occurrences of a low level decision signal at the output of the threshold circuit. The count of counter 63 represents the number of the data $|\Delta F|$ omitted from, that is, not included in, the frame difference summation data. A comparator circuit 64 compares the content of counter 63 with a reference value fed thereto from a reference generator 65. For example, the reference value from generator 65 may correspond to 80 percent of the number of picture elements included in one segmental area. When the content of counter 63 exceeds the reference value from generator 65, comparator circuit 64 produces a control signal for zeroing a movement vector, as hereinafter described.

Summation circuit 60 preferably includes a digital integrator for summing the data fed from gate circuit 56 to produce frame difference summation data $\Sigma|\Delta F|$ for the respective picture elements of each of the segmental areas substantially in the same manner as described above in connection with the embodiment of FIG. 6. The summation circuit 60 also includes a memory having a number of memory sections or addresses corresponding to the number of the segmental areas included in one field for storing the successively produced frame difference summation data in the respective memory sections. The frame difference summation data $\Sigma|\Delta F|$ are fed from summation circuit 60 to a minimum data detector circuit 61. Minimum data detector circuit 61 receives frame difference summation data $\Sigma|\Delta F|$ fed successively thereto from summation circuit 60 for all of the segmental areas of a frame to normally produce, at an output terminal 62, a signal indicative of a movement vector which represents the amount and direction of movement of a television image from the previous frame to the present frame. However, minimum data detector circuit 61 responds to the control signal from comparator 64 to zero the output movement vector. This means that circuit 61 inhibits generation of an unreliable movement vector when a relatively great number of frame difference data are omitted from the data used in detecting a movement vector.

It will be appreciated that, in the embodiment of FIG. 9, the output of threshold circuit 59 which controls gating circuit 56 is effective to indicate whether the segmental area of the frame being considered is part of a stationary background portion of the television image or is part of a moving object. Gating circuit 56 is opened by its control signal from threshold circuit 59 for passing the data difference $|\Delta F|$ to summation or accumulating means 60 only when memory circuit 57 subtracter 58 and threshold circuit 59 cooperate to sense that the segmental area being considered is from a moving object and not a stationary background.

Figure 10:
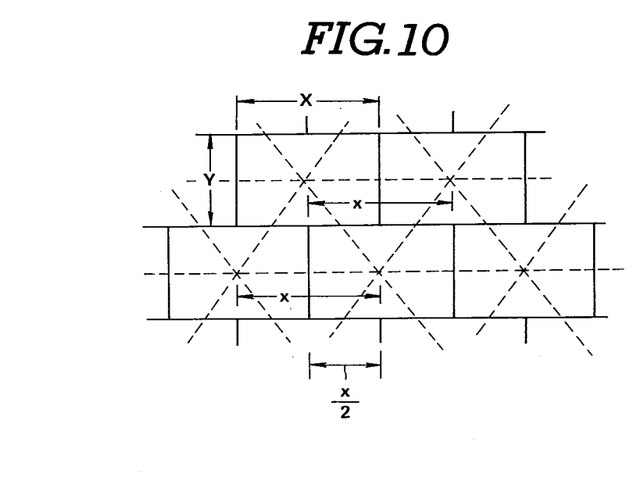
FIG. 10 is a diagram showing another manner in which a video signal may be divided into a plurality of segmental areas.

FIG. 10 shows a pattern in which the picture elements of a segmental area may be arranged to improve the capacity for detecting movement of television images having vertical strips or other patterns having high spatial frequencies. In the pattern shown on FIG. 10, a pixel representative of a first segmental area and a pixel representative of a second segmental area just below or above the first segmental area are offset $\frac{1}{2}X$ in the horizontal direction to provide a checkerboard-like pattern, in which X is the horizontal distance between two representative pixels adjacent to each other in the horizontal direction. Here again, the segmental areas may partially overlap each other.

Figure 11:
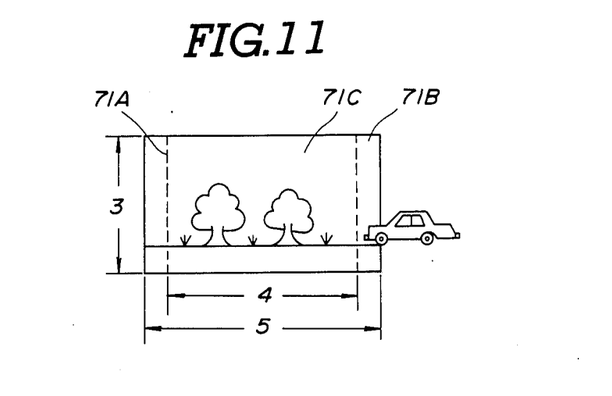
FIG. 11 is a diagram to which reference will be made in explaining disadvantages of the conventional movement vector detecting apparatus, for example, as shown on FIG. 1.

FIG. 11 illustrates an image comprised of an automobile that starts crossing a distinct background. When using a conventional movement vector detecting apparatus, no movement vector is detected in the region 71B and movement of the automobile cannot be detected until the automobile has, at least to some extent, entered the region 71C. Since a low-pass filter is normally used to filter the video signal for suppressing sudden image changes and discontinuous movements, substantial time is required until the movement is corrected after a movement is detected in the region 71C. For these reasons, in the reproduced picture, the automobile appears to move in an unnatural manner, that is, as if it starts running after the application of braking.

Figure 12:
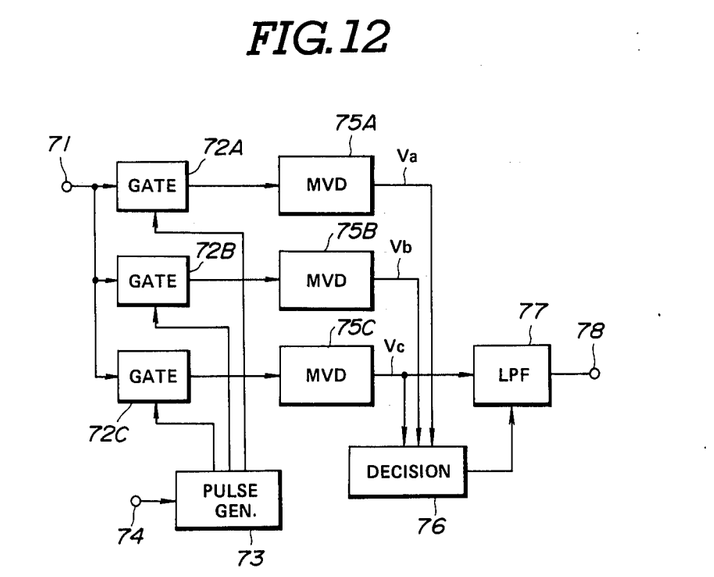
FIG. 12 is a block diagram showing one application of a movement vector detecting circuit according to the invention.

FIG. 12 shows a standard conversion system to which movement vector detecting apparatus according to the invention can be advantageously applied for eliminating the above disadvantages inherent in the conventional apparatus. The system of FIG. 12 includes an input terminal 71 to which a high definition television (HDTV) signal is applied. The HDTV signal is supplied from input terminal 71 to three gate circuits 72A,72B and 72C. Gate circuit 72A serves to pass picture elements included in the left-hand region 71A on FIG. 11, and gate circuits 72B and 72C serve to pass picture elements included in the right-hand region 71B and the center region 71C, respectively. A pulse generator 73, triggered by a suitable sync signal applied to a terminal 74, provides suitably timed gating signals to gate circuits 72A,72B and 72C. The center region 71C overlaps the output image and the left-hand and right-hand regions 71A and 71B do not overlap the output image, that is, are outside the desired output image.

The outputs of gate circuits 72A,72B and 72C are coupled to movement vector detecting circuits 75A,75B and 75C, respectively. Each of the movement vector detecting circuits 75A,75B and 75C is substantially the same in structure as that described above in connection with FIG. 6 or FIG. 9. Movement vector detector 75A serves to detect a movement vector Va corresponding to movement of the automobile in the left-hand region 71A, movement vector detector 75B serves to detect a movement vector Vb corresponding to movement of the automobile in the right-hand region 71B, and movement vector detecting circuit 75C serves to detect a movement vector Vc corresponding to movement of the automobile in center region 71C (FIG. 11). These movement vectors Va,Vb and Vc are all supplied to a decision circuit 76. The movement vector Vc is also supplied to a digital low-pass filter 77 which is effective to suppress sudden movement vector changes so as to minimize large jumping and discontinuous movements. Digital low-pass filter 77 is of a known type that changes its characteristics in a manner to retard the time when the movement vector falls or to advance the time when the movement vector rises in accordance with a control signal fed thereto from decision circuit 76.

Decision circuit 76 produces such control signal for digital low-pass filter 77 on the basis of the movement vectors Va, Vb and Vc detected for the regions 71A, 71B and 71C on FIG. 11. The control signal for filter 77 is generated when the object moves out of the output image or when the object moves into the output image. The type of control signal generated in the cases i to iv listed on the below table is described thereafter.

| CASE | Va | Vb | Vc |
| --- | --- | --- | --- |
| i | to the left | / | to the left |
| ii | / | to the right | to the right |
| iii | / | to the left | to the left |
| iv | to the right | / | to the right |

In the above table, each character / designates a movement vector that is not considered in decision circuit 76. The object (automobile) moves out of the output image to the left in case i, and the object moves out of the output image to the right in case ii. When the object moves out of the output image, as in case i or ii, decision circuit 76 provides a control signal which is effective to cause low-pass filter 77 to retard the time when the movement vector falls so as to maintain the magnitude of the movement vector in center region 71C (FIG. 11). This is effective to suppress the tendency to decrease the magnitude of the movement vector when the object moves out of the output image and thereby eliminates the apparent decrease in the speed of movement of the object as the latter moves out of the output image.

The object moves into the output image from the right in case iii of the above table, and the object moves into the output image from the left in the case iv. When the object moves into the output image, decision circuit 76 provides a control signal which causes low-pass filter 77 to advance the time when the movement vector rises. Therefore, the movement vector in the region 71C can rise as soon as the object arrives at an end of the output image in entering the latter. In cases other than those listed in the above table, the characteristic of the low-pass filter is maintained unchanged.

The movement vector provided at output terminal 78 may be used for effecting movement correction in a field number conversion circuit of a standard conversion system, as hereinafter described.

Figure 13:
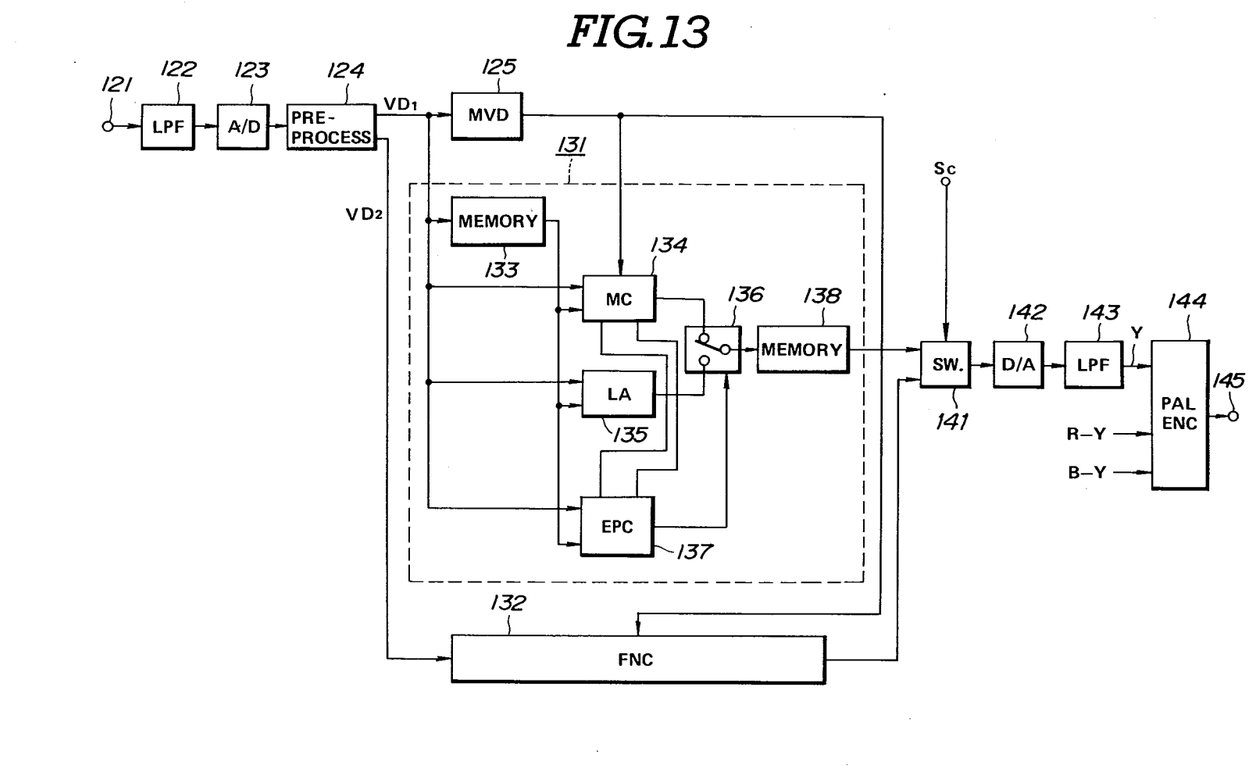
FIG. 13 is a block diagram showing a video signal conversion circuit to which a movement vector detecting circuit according to the invention may be advantageously applied.

For example, as shown in FIG. 13, the invention may be applied to field number conversion when effecting standard conversion from a HDTV (high definition television) system employing 1125 lines per frame and 60 fields per second, to a PAL TV (phase alternation by line television) system employing 625 lines per frame and 50 fields per second.

The standard conversion system of FIG. 13 is shown to include an input terminal 121 which receives a luminance signal included in an HDTV signal. Such luminance signal is applied through a low-pass filter 122 to an analog-to-digital converter 123 which converts it into a corresponding digital signal. The digital signal is applied from analog-to-digital converter 123 to a preprocessing circuit 124.

Preprocessing circuit 124 utilizes a digital frequency conversion technique to convert the line number from 1125 lines to 625 lines and also a non-interlace technique to provide, from each field of the HDTV signal simultaneously formed first and second fields each consisting of 625-lines and each displaying the same video image, but with the video images of the first and second fields being offset by 0.5 line distance. Further, the first and second fields produced from each field of the HDTV signal each occur at the rate of 60/sec. Thus, preprocessing circuit 124 simultaneously provides a first digital video signal $V_{D1}$ make up of only the first field and which contains 625 lines per frame and 60 frames per second, and a second digital video signal $V_{D2}$ make up of only the second field and which contains 625 lines per frame and 60 frames per second. The first digital video signal $V_{D1}$ is applied to a movement vector detection circuit 125 and also to a first field number conversion circuit 131. The second digital video signal $V_{D2}$ is applied to a second field number conversion circuit 132 which is substantially the same in structure as the first field number conversion circuit 131.

The movement vector detection circuit 125 detects movement vectors in response to the first digital video signal $V_{D1}$. The non-interlace technique used in preprocessing circuit 124 permits movement vector detection circuit 125 to detect movement vectors at time intervals of 1/60 of a second. This is effective to improve the accuracy of detection of movement vectors and facilitate formation of interpolation signals. Movement vector detection circuit 125 produces field difference data between present field data and previous field data substantially in the same manner as described in connection with FIG. 6 or FIG. 9.

The first field number conversion circuit 131 provides a digital video signal containing a first 625-lines per frame/50-frames per sec. field to one input of a switching circuit 141 which, at another input thereof, receives a second digital video signal containing a second 625-lines per frame/ 50-frames per sec. field and being provided by second field number conversion circuit 132. The switching circuit 141 also receives a suitably generated control signal $S_c$ which inverts at time intervals of 1/50 of a second so that switching circuit 141 is changed-over at that rate and provides, at its output, a 625-lines per frame/50-fields per sec. digital luminance signal. Such digital luminance signal is then applied to a digital-to-analog converter 142 which converts it into a corresponding analog signal. The analog signal is applied from digital-to-analog converter 142 through a low- pass filter 143 to a PAL color encoder 144. PAL color encoder 144 receives additional inputs including red and blue color difference signals R-Y and B-Y which have been each subjected to line- and field-number conversion similar to that described for the luminance signal Y. The PAL color encoder 144 generates a composite color television signal according to the PAL standard at an output terminal 145 which is for connection to a PAL color television monitor or receiver. The first field number conversion circuit 131 includes a field memory 133, a movement correction circuit 134, a linear approximation circuit 135, a switching circuit 136, an error processing circuit 137, and a memory 138. Field memory 133 receives the first digital video signal $V_{D1}$ from preprocessing circuit 124 and provides, at its output, a digital video signal indicative of previous field data.

Movement correction circuit 134 receives the first digital video signal $V_{D1}$ indicative of present field data directly from preprocessing circuit 124, the digital video signal indicative of previous field data from field memory 133, and a movement vector indication signal from movement vector detection circuit 125.

Figure 14:
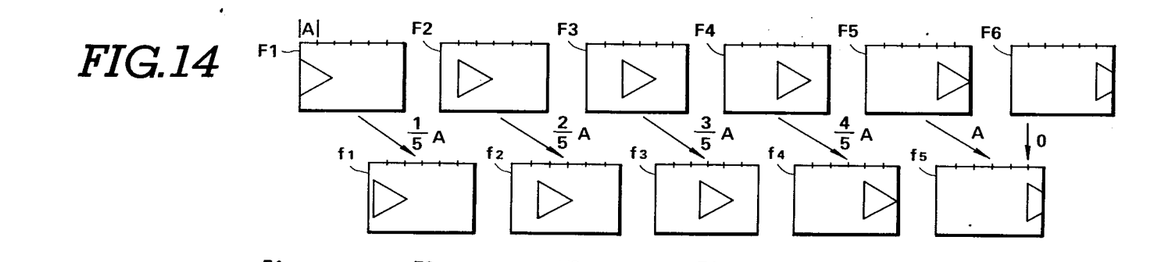
FIGS. 14–16 are diagrams to which reference will be made in explaining the operation of circuits included in the conversion circuit of FIG. 13.

Movement correction circuit 134 operates to reduce the field number by correcting movement of a moving object. This operation will be described in greater detail with reference to FIG. 14, in which F1,F2,F3,F4,F5 and F6 indicate six image fields which appear in this sequence to represent uniform movement of a triangularly-shaped object from the left to the right. In each constant time interval of 1/60 of a second, the object moves a constant distance A which corresponds to the movement vector detected in movement vector detection circuit 125. In the illustrated case, the six fields F1 to F6 are converted into five fields f1 to f5. Since the total distance of movement of the triangularly-shaped object is 5A between the fields F1 and F6, the field number can be reduced from six to five by shifting the image in the field F1 a distance (1/5)A to provide a shifted image in the field f1, shifting the image in the field F2 a distance (2/5)A to provide a shifted image in the field f2, shifting the image in the field F3 a distance (3/5)A to provide a shifted image in the field f3, shifting the image in the field F4 a distance (4/5)A to provide a shifted image in the field f4, and shifting the image in the field F5 a distance A to provide a shifted image in the field f5. Since the image in the field F6 is the same as the shifted image in the field f5, the last field F6, in effect, is removed. The image shifting operation can be realized by suitable memory address control. Although movement correction circuit 134 can achieve complete field number conversion for images obtained during panning or tilting of a television camea if the movement vectors can be detected with high accuracy, problems could occur for images having objects moving simultaneously in various ways.

Figures 15, 16:
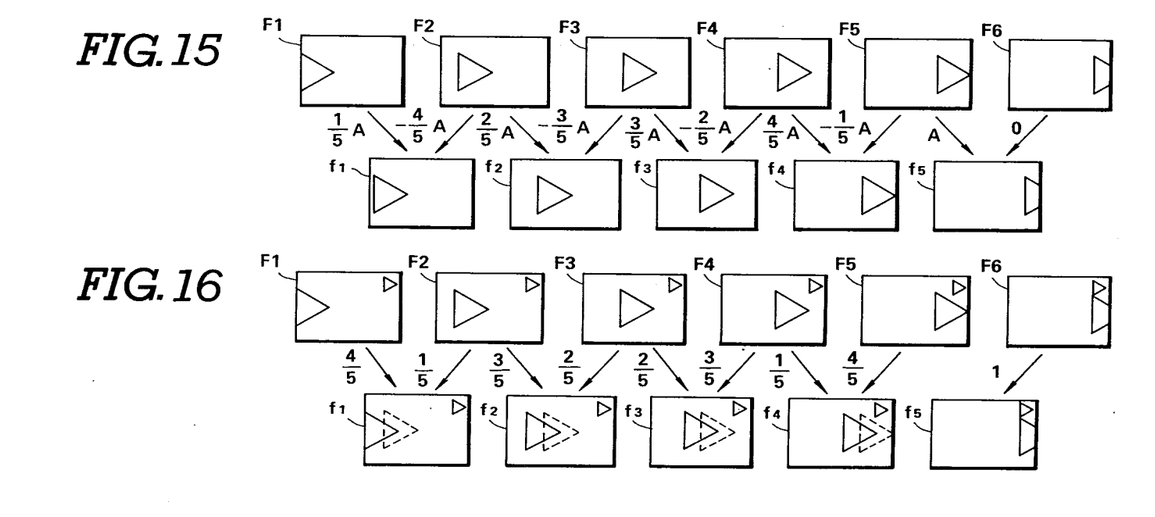

Another way in which field number conversion can be effected by movement correction circuit 134 is illustrated in FIG. 15, in which F1,F2,F3,F4,F5 and F6 again indicate six image fields which appear in this sequence to represent uniform movement of an object from left to the right. In each constant time interval of 1/60 of a second, the object moves a constant distance A which corresponds to the movement vector detected in movement vector detection circuit 125. In the illustrated case, the six fields F1 to F6 are converted into five fields f1 to f5 using previous and present field data. The field number can be reduced from six to five by halving the output signal corresponding to the sum of an image resulting from the shifting of the image in the field F1 by a distance (1/5)A and an image resulting from the shifting of the image in the field F2 by a distance ($-4/5$)A to provide a shifted image in the field f1; halving the output signal corresponding to the sum of an image resulting from the shifting of the image in the field F2 by a distance (2/5)A and an image resulting from the shifting of the image in the field F3 by a distance ($-3/5$)A to provide a shifted image in the field f2; halving the output signal corresponding to the sum of an image resulting from the shifting of the image in the field F3 by a distance (3/5)A and an image resulting from the shifting of the image in the field F4 by a distance ($-2/5$)A to provide a shifted image in the field f3; halving the output signal corresponding to the sum of an image resulting from the shifting of the image in the field F4 by a distance (4/5)A and an image resulting from the shifting of the image in the field F5 by a distance ($-1/5$)A to provide a shifted image in the field f4; and halving the output signal corresponding to the sum of an image resulting from the shifting of the image in the field F5 by a distance A and the image in the field F6 to provide a shifted image in the field f5. Since the image provided by halving the output signal corresponding to the sum of the image in the field F6 and an image resulting from the shifting of the image in the next field F7 by a distance $-A$ is the same as the image in the field f5, one of the images F6 and F7 is removed. Although the image resulting from the shifting of an image in the previous field by a distance (n/5)A is substantially the same as the image resulting from the shifting of an image in the present field by a distance $[-(5-n)/5]A$, in which n is an integer from 1 through 5, these images are desirably added, and the sum then halved, for equalizing the S/N ratio concerning random noises produced during linear approximation and the S/N ratio concerning the random noises produced during movement correction and also for vignetting the image when the movement vector is erroneously detected.

The linear approximation circuit 135 operates to reduce the field number by calculating a weighted average of the images in two successive fields to which predetermined weights are respectively assigned. This operation will be described in greater detail with reference to FIG. 16 in which F1,F2,F3,F4,F5 and F6 indicate six image fields which appear in this sequence at time intervals of 1/60 of a second. The smaller triangle in each field of FIG. 16 indicates a stationary object and the larger triangle indicates a moving object. In the illustrated case, the six fields F1 to F6 are converted into five fields f1 to f5. The image in field F1 multiplied by a weight (4/5) and the image in field F2 multiplied by a weight (1/5) are combined or averaged to provide an image in the field f1. Each triangle indicated in broken lines is the image in the subsequent field. The image in the field F2 multiplied by a weight (3/5) and the image in the field F3 multiplied by a weight (2/5) are combined to provide an image in the field f2. The image in the field F3 multiplied by a weight (2/5) and the image in the field F4 multiplied by a weight (3/5) are combined to provide an image in the field f3. The image in the field F4 multiplied by a weight (1/5) and the image in the field F5 multiplied by a weight (4/5) are combined to provide an image in the field f4. Finally, the image in the field F6 is used as the image in the field f5.

Although linear approximation has a tendency to double or vignette a moving image, it can provide a better stationary image than movement correction.

Figure 17:
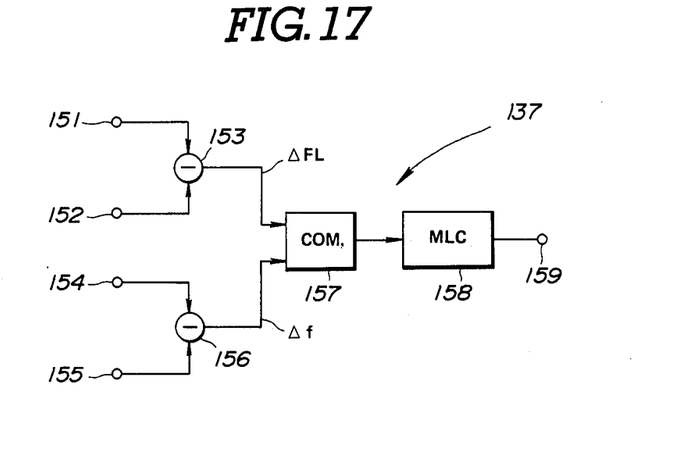
FIG. 17 is a block diagram of an error processing circuit included in the conversion circuit of FIG. 13.
Figure 18:
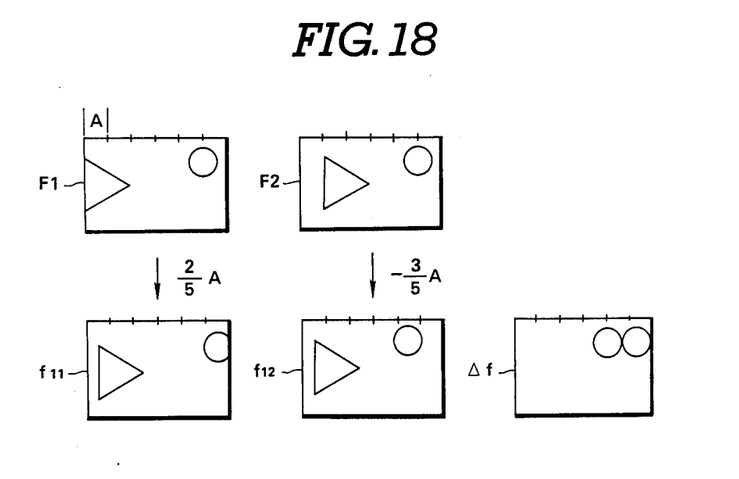
FIG. 18 is a diagram to which reference will be made in explaining the operation of the circuit of FIG. 17.

The error processing circuit 137 will now be described with reference to FIG. 17 in which an input terminal 151 receives a digital video signal corresponding to the previous field F1 (FIG. 18), and an input terminal 152 receives a digital video signal corresponding to the present field F2 (FIG. 18). The digital video signals are applied from terminals 151 and 152 to a subtracter 153 which produces field difference data FL corresponding to the difference between the previous and present field data by calculating differences in the positions or coordinates of the picture elements of the segmental area of the previous field from the coordinates of the respective picture elements of the corresponding segmental area of the present field. The circuit 137 also includes an input terminal 154 receiving a signal corresponding to the field f11 (FIG. 18) and an input terminal 155 receiving a signal corresponding to the field f12 (FIG. 18). The image in the previous field F1 is shifted a distance (2/5)A to provide an image in the field f11. The image in the present field F2 is shifted a distance (−3/5)A to provide an image in the field f12. These signals are applied to a subtracter 156 which produces field difference data Δf by calculating differences in the positions or coordinates of the picture elements of the segmental area of the field f11 relative to the coordinates of the respective picture elements of the corresponding segmental area of field f12.

The field difference data ΔFL and the field difference data Δf are compared in a comparator circuit 157. As shown in FIG. 18, the images of the fields f11 and f12 are the same in respect to the position of the moving triangularly shaped object and, thus, the field difference data Δf have no moving portion. The images of the fields F1 and F2 are the same in respect to the position of the stationary circular portion. Consequently, it can be determined that movement correction by circuit 134 is reliable when ΔFL>Δf and that the movement correction is not reliable when ΔFL>Δf. The comparator circuit 157 produces a high level signal when ΔFL>Δf and a low level signal when ΔFL<Δf. The output of the comparator circuit 157 is applied to a majority logic circuit 158 which provides a decision for each of the segmental areas. More particularly, when the number of occurrences of a high level signal at the output of comparator circuit 157 is greater than the number of occurrences of a low level signal at the output of comparator circuit 157 for a segmental area, majority logic circuit 158 provides a high level signal at an output terminal 159. Otherwise, majority logic circuit 158 produces a low level signal at output terminal 159 which is coupled to switching circuit 136 on FIG. 13. Switching circuit 136 connects movement correction circuit 134 to memory 138 in response to a high level control signal from terminal 159 of error processing circuit 137. On the other hand, switching circuit 136 is changed-over so as to connect linear approximation circuit 135 to memory 138 in response to a low level control signal from error processing circuit 137. Therefore, movement correction by circuit 134 is employed when a moving image is involved and linear approximation by circuit 135 is employed when a stationary image is being processed.

Although specific embodiments of the invention have been described above, it is apparent that the invention is not limited to those precise embodiments, and that many alternatives, modifications and variations may be effected therein by one skilled in the art without departing from the scope or spirit of the invention as defined in the appended claims.

What is claimed is:

1. An apparatus for detecting a movement vector indicating an amount and direction of a movement in a picture defined by a television signal made up of successive intervals, comprising:
    means for detecting difference data corresponding to the difference between data for a predetermined area of the picture in two of said successive intervals;
    gating means for gating said difference data;
    means for producing a control signal for said gating means which closes the latter to said difference data in response to data indicating a stationary background portion of the picture and which opens said gating means to said difference data in response to data indicating a moving object in the picture;
    means for accumulating the difference data which passes through said gating means; and
    means for detecting a minimum value of the accumulated difference data to produce a detected minimum value as an indication of said movement vector.

2. Apparatus according to claim 1; further comprising means responsive to said control signal for determining the incidence of closing of said gating means; means for comparing the incidence of closing of said gating measn to a predetermined value; and means for zeroing the detected minimum value of the accumulated difference data when said incidence of closing of said gating means exceeds the predetermined value.

3. Apparatus according to claim 1; in which said means for detecting difference data includes subtractor means having inputs receiving the data for said predetermind area of the picture in a present one of said intervals and in a prior interval, respectively, and an output providing said difference data, and converting means converting the output of said subtractor means into a corresponding absolute value of said difference data.

4. Apparatus according to claim 3; in which said means for producing the control signal includes minimum data detector means for detecting the position of a picture element for which said absolute value of the difference data is a minimum, and decision means responsive to the detected position from said minimum data detector means for providing said control signal.

5. Apparatus according to claim 4; in which said gating means includes a first switching circuit having a first input provided so as to receive said absolute value of the difference data, a second input connected to a source of zero data, and an output selectively connected with said first and second inputs in response to said control signals from said decision means.

6. Apparatus according to claim 5; in which said means for accumulating includes summing means connected to said output of the first switching circuit.

7. Apparatus according to claim 6; further comprising a second switching circuit having a first input connected to said means for detecting a minimum value of the accumulated difference data, a second input connected to a source of zero data, and an output, counting means for counting the number of times said control signal causes connection of said second input with said output in the first switching circuit, reference means for establishing a predetermined counted value, and comparator means for comparing a number counted by said counting means with said predetermined counted value and being operative to connect said output of said second switching circuit with said second input of the latter when said number counted by the counting means attains said predetermined counted value, thereby to zero the detected minimum value of the accumulated difference data.

8. Apparatus according to claim 3; in which said means for producing the control signal includes memory means for storing one of said intervals of the incoming television signal and providing output data for a previous interval during reception of a present interval, second subtracter means having inputs receiving said incoming television signal and said output data from the memory means and providing a difference output, and threshold means connected with said difference output of the second subtracter means to provide said control signal for opening said gating means only when said difference output exceeds a predetermined threshold value.

9. Apparatus according to claim 8; in which said gating means provides predetermined values to said means for accumulating when said control signal closes the gating means, and said means for accumulating includes summing means for providing a summation of the absolute values of the difference data passed through said gating means and of said predetermined values.

10. Apparatus according to claim 9; further comprising counting means connected with threshold means for receiving said control signal therefrom and counting the number of closings of said gating means and providing a corresponding counted value, reference means providing a reference value corresponding to a predetermined number, comparator means comparing said counted value with said reference value, and means connecting said comparator means with said means for detecting the minimum value of the accumulated difference data so as to zero the detected minimum value of the accumulated difference data when said counted value exceeds said reference value.

11. Apparatus according to claim 1; in which said successive intervals are frames of the television signal, said predetermined area is one of a plurality of segmental areas into which each of said frames is divided, and each of said segmental areas is represented by a representative picture element; and in which said means for detecting difference data includes means for extracting said representative picture element for each of said segmental areas and providing data indicative of the position of said extracted representative picture element, memory means for temporarily storing said data indicative of the positions of the extracted representative picture elements, and subtracter means having first and second inputs receiving said television signal and data read out of said memory means, respectively, and an output at which said difference data is provided in correspondence to differences in the positions of the representative picture elements of respective segmental areas in a present frame and a previous frame, respectively.

12. In apparatus for detecting movement of a television image in response to frame difference data corresponding to a difference between present frame data and previous frame data, and in which a video signal is divided into a plurality of segmental areas for each frame and each of said segmental areas is represented by a representative picture element: the combination of means for producing said frame difference data for said each segmental area in accordance with differences in the positions of said representative picture element of a respective segmental area in a present frame and a previous frame, respectively;

means for summing said frame difference data so as to provide a summation thereof;

means for comparing frame difference data magnitudes to a first predetermined value; and means for omitting from said summation the frame difference data having magnitudes smaller than the first predetermined value.

13. An apparatus according to claim 12; further comprising means for comparing said frame difference data omitted to a second predetermined value, means for zeroing said summation when said frame difference data omitted from said summation exceeds the second predetermined value.

* * * * *